Nov. 23, 1954  M. VILELLA  2,694,922
APPARATUS FOR TEMPERATURE PRESSURE TESTING MATERIALS
Filed Sept. 24, 1951

Mario Vilella
INVENTOR.

BY *Clarence A. O'Brien*
*and Harvey B. Jacobson*
Attorneys

United States Patent Office 2,694,922
Patented Nov. 23, 1954

2,694,922

APPARATUS FOR TEMPERATURE PRESSURE TESTING MATERIALS

Mario Vilella, Newark, N. J., assignor to Vitron Research Corp., Spring Valley, N. Y., a corporation of New York Application September 24, 1951, Serial No. 248,034

5 Claims. (Cl. 73—15.6)

This invention relates to a novel, useful and simplified experimental apparatus for testing and ascertaining the probable forces of rupture of a given sample or test specimen of material in reference to reaction to high compression and high temperatures, whereby to reveal the true character of the specimen and to enable the experimenter to aptly compile needed data for practical use in the high temperature-pressure field of research activities.

As the introductory statement implies, it is an object of the invention to provide an aptly suitable and feasible apparatus which, while of the utmost simplicity in construction, makes it conveniently possible for those interested in research problems to achieve the desired ends by simultaneously subjecting the stated sample to the conjoint action of high heat and pressure, thus enabling one to make the required periodical examinations of the sample with a view toward proving or disproving the results and findings of each experiment made.

Another object has to do with an apparatus which takes the physical form of a furnace which is susceptible of being successfully heated electrically, or alternatively through the medium of exothermic reactions, with predetermined temperatures and pressures simultaneously applied to the sample far beyond those available in any known analogous construction.

A further object of the invention is to provide a specially constructed apparatus or furnace which is primarily intended to operate at relatively short intervals of time and wherein the upper limit of temperature is to be determined by losses due to conduction; the maximum pressure being limited by the physical properties and strength-durability of the parts and materials selected for use in the construction of the apparatus itself.

A still further object appertains to a special construction which, when set up for extended periods of use, has a coolant circulating jacket which is appropriately incorporated without altering the basic features of construction; a construction which, because of its preferred structural embodiment, is wholly dependant upon a controllable outside source of pressure for reliable and adequate functioning.

Briefly, in carrying out the invention, a cylinder is mounted fixedly atop a base, the bore of the cylinder being closed at its bottom by way of said base and being open at the top to contain and properly house the test specimen or sample. A piston operates in the upper open end of the bore, said piston being actuated by the aforesaid outside source of pressure, here a down-thrusting press plunger.

A more general object of the invention is to provide an apparatus of the aforementioned nature which is structurally distinct, is basically unique, which is built for long lasting service and constitutes an adaptation in which manufacturers and research experimenters will find their respective requirements and needs adequately met and effectually contained.

Other objects and advantages will become more readily apparent from the following description and the accompanying sheet of illustrative drawings.

In the accompanying sheet of drawings, wherein like numerals are employed to designate like parts throughout the views.

Figure 1:
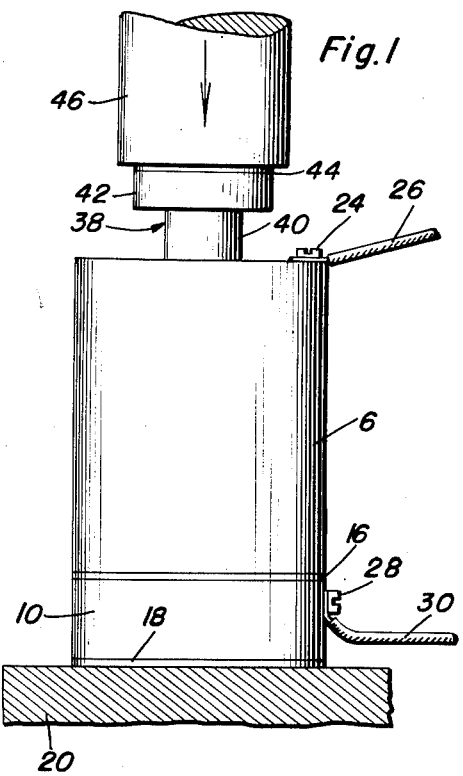
Figure 1 is an elevational view of a testing apparatus constructed in accordance with the principles of the present invention and showing the same supported on but insulated from a support and showing the end-thrust ram in position for use.
Figure 2:
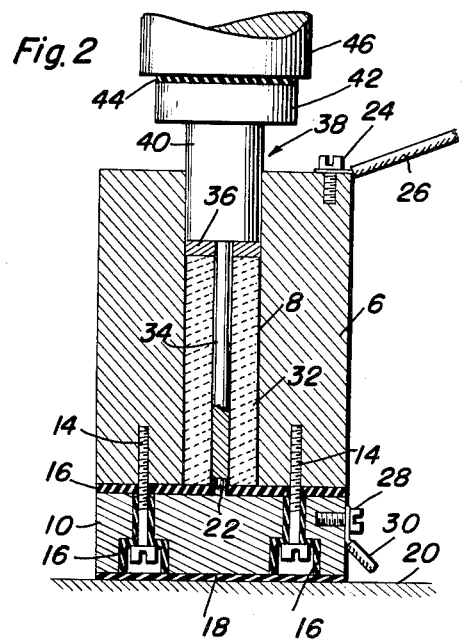
Figure 2 is a view based on Figure 1 with parts in section and elevation showing the details of construction of one embodiment of the invention.

Reference is had to the general assembly view, wherein all of the parts are best shown, that is, Figure 2, wherein the body, which is preferably a simple cylinder, is denoted by the numeral 6. This is of an appropriate grade of metal such as will conduct electrical current. The central bore 8, which is the cylinder proper, opens thru upper and lower ends of the body. The cylinder is supported on a circular metallic base 10 and in practice is appropriately fastened thereto. By preference, there are screw-threaded bolt holes in the bottom of the cylindrical body, as shown at 12—12 in Figure 4. There are complemental bolt holes in the base and these have their lower ends counterbored and the holes and sockets serve to accommodate headed bolts 14—14 which pass through the holes and are screwed into the sockets. It will be noticed in this connection, that a sheet or disk of suitable insulation material 16 is interposed between the coacting surfaces of the base and cylinder. Also, the bolt holes in the base are lined with insulation material 16—16. Generally, the base has a sheet of insulation 18 fastened to the bottom thereof and adapted to rest on the fixed supporting surface 20. It will be noticed that the base, at its center, is provided with an upstanding axial projection 22 which pierces the insulation and extends axially into the bore 8. It will be obvious that the base and body provide a structure through which electrical current is adapted to pass or flow. To accomplish this, there is an appropriate binding post 24 mounted on the upper end of the cylinder to accommodate a current conducting wire 26. There is a complemental binding post 28 on the base to accommodate the remaining wire 30.

The numeral 32 denotes a sleeve of refractory material which lines the bore 8 and the sleeve, in turn, has a bore in which the test specimen or work sample 34 is fitted. The lower end of the sample rests in electrical contact with the projection or contact element 22. The upper end of the sample projects above the corresponding end of the sleeve where it is surrounded by a compressible gasket or packing ring 36, the material in the ring being a conductor of electricity. The piston 38 is also an electrical conductor and the stem 40 thereof extends down into the bore 8 where it coacts with the sample 34 and the gasket ring 36. The piston has a head 42 which is appropriately enlarged and provided with a facing disk 44 of insulation material and coacting with this is the end-thrust ram 46. The ram may be mounted on an appropriate pressurized press (not shown).

Figure 4:
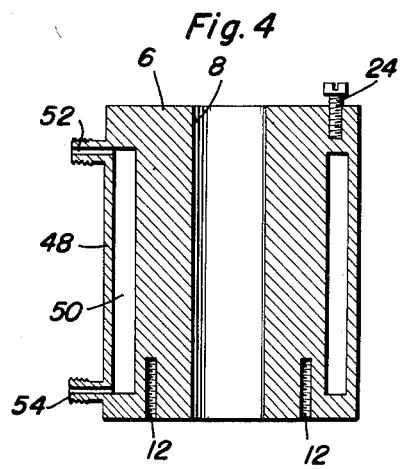
Figure 4 is a sectional view through a cylinder like that shown in Figure 2 but with a coolant circulating jacket added.

The cylinder or body in the modification of Figure 4 is the same and is denoted by the numeral 6 and the bore, or cylinder proper, by the numeral 8. The difference here is that the cylinder is provided with a coolant circulating jacket 48 with a circulating space 50 and with appropriate hose connections 52 and 54, respectively.

Figure 3:
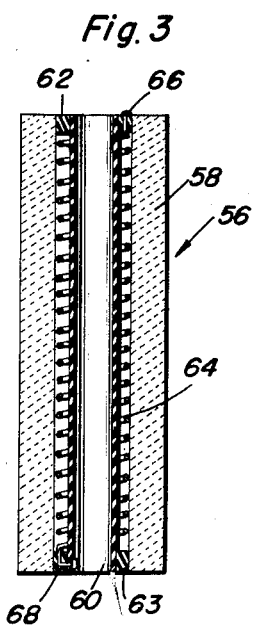
Figure 3 is a central longitudinal sectional view through a test specimen or work sample holder of a modified form.

In Figure 3 the sample holder is denoted by the numeral 56 and this is a slight modification in construction and comprises a sleeve of refractory material 58, an axial lining 60 of insulation with insulation rings 62 and 63 fitted into the end portion. The numeral 64 denotes a heating coil which surrounds the insulation and is anchored at its respective ends as at 66 and 68. The type of holder seen in Figure 2 is adapted where the device is used only for short intervals of time. Where longer interval operation is required, the cylinder shown in Figure 4 is used. The work holder means may be either that shown in Figure 2 or Figure 3 depending on the expected requirements of the user.

Since the work sample 34 in Figure 2 is of current conducting material, it is obvious that when the desired current is applied, it flows through the wires 26 and 30 and flows from the connection or post 24 through the body 6, through the stem 40, down through the sample or work-piece 34, through the contact 22 and base 10 and out by way of the wire 30. By thus applying the desired pressure on the ram and piston forcing down on the sample, it is simultaneously subjected to the reaction of high heat and pressure, whereby to permit the desired test to be made. The holder shown in Figure 3 is used where the sample is a non-conductor.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. Apparatus for treating a sample of material comprising a metal body formed with a bore for receiving said sample, a metal member covering one end of said bore and including a contact extending into said bore, insulation means between said body and said member, said contact extending through said insulation means, a metal piston movable in said bore and in electrically conductive relation with said body, and terminal means on said body and said member for applying a current to the sample in said bore while pressure is applied thereto by said piston.

2. Apparatus for subjecting an electrically conductive sample of material to high pressure while simultaneously heating the same to elevated temperatures comprising an electrically conductive body having a bore for receiving and confining said sample, an electrically conductive foundation member closing the lower end of said bore and in insulated relation to said body, a piston in electrically conductive relation to said body slidable in and closing the upper end of said bore for electrically contacting and compressing said sample within said bore, said sample being also in electrical contact with said foundation member and terminal means on said body and member for passing an electrical current through said sample while said sample is being compressed.

3. Apparatus as in claim 2 wherein said foundation member includes a contact element projecting into said bore.

4. Apparatus for subjecting a given sample to high end-thrust pressure while it is simultaneously heated to a high temperature comprising a body having a bore for reception and retention of the sample to be tested, a foundation base closing the lower end of said bore, said base and said body being of electrically conductive material, said base being insulated from said body and having a contact element projecting into said bore and operative to make electrical contact with one portion of said sample, an end-thrust pressure applying piston slidable in the upper end of said bore and operative to make electrical contact with another portion of said sample, said piston being in electrically conductive relation with said body, a terminal on said body and a second terminal on said base for applying a current which passes through said body, piston, sample and base.

5. Apparatus for treating a sample of electrically conductive material comprising a metal body formed with a bore for containing said sample, means for closing one end of said bore and including an electrical contact extending into said one end of the bore for making electrical contact with a portion of said sample, a piston in said bore in electrically conducting relation to said body and operative to make electrical contact with another portion of said sample upon movement of the piston within said bore, and terminal means for supplying current to said body and electrical contact whereby current may pass through said sample while being compressed within the bore by said piston.

References Cited in the file of this patent

UNITED STATES PATENTS

| Number | Name | Date |
|---|---|---|
| 1,907,907 | Varney | May 9, 1933 |
| 1,988,597 | Karrer | Jan. 22, 1935 |
| 2,248,280 | Nobiron | July 8, 1941 |
| 2,375,032 | Parke | May 1, 1945 |
| 2,402,738 | Dietert | June 25, 1946 |
| 2,521,206 | Dietert et al. | Sept. 5, 1950 |